Patented Aug. 23, 1938

2,127,589

UNITED STATES PATENT OFFICE 2,127,589

CONTROL MECHANISM FOR VARIABLE SPEED TRANSMISSION

Richard Erban, New York, N. Y.

Application February 20, 1936, Serial No. 64,895

19 Claims. (Cl. 74—472)

My invention relates generally to an arrangement for automatically controlling the ratio of transmission from a prime mover and more particularly from a prime mover whose operation is accompanied or effected by a fluid flow. Steam engines, Diesel oil engines, gasolene engines and the like are examples of prime movers whose operation is effected by a fluid flow. The exhaust of an internal combustion engine is an example of a fluid flow that accompanies but does not effect the operation of the prime mover.

The movement of a vehicle or part thereof relatively to a fluid medium is an example of a fluid flow induced by or incident to vehicular operation by a prime mover.

My invention contemplates its employment in association with a prime mover which delivers its torque through a transmission of a continuously variable type and frequently referred to as an infinitely variable transmission and the operation of which prime mover has associated therewith either as an energizing factor or merely as an accompanying factor, a fluid flow. Electrical, hydraulic, and adhesive transmissions are examples of the infinitely variable type.

The general object of my invention is the provision of an arrangement whereby the transmission is automatically controlled as to its ratio by a fluid flow which forms either an energizing or an accompanying index factor of engine operation, or as an incidental factor as when the movement of a member or vehicle creates a flow of the atmosphere relatively to the vehicle.

I herein disclose embodiments of my invention applied generally and also applied specifically to a prime mover of the internal combustion gas engine type delivering its torque through a transmission of the continuously variable adhesive type, and will describe the nature, objects, theory of operation and details of my invention as so specifically applied in connection with the construction and operation of a motor vehicle employing such prime mover and transmission. It will, however, be understood that this disclosure of the specific application of my invention to a motor vehicle of the gasolene engine type is merely for purposes of convenience of disclosure, and that my invention is not to be so limited unless called for specifically by the language of the claims.

The performance of an automobile is the resultant of the power applied by the engine to the road wheels and the resistance offered to the movement of the vehicle under such power by factors such as road, wind resistance and the like, and which are beyond the control of the operator. The power delivered by the motor to the road wheels is roughly in proportion to the gasoline consumption which, in turn, is determined by the position of the accelerator and the ratio of transmission from the motor to the road wheels.

In the embodiments of the invention herein disclosed, the control is effected by means positioned in the path of a fluid flow generally present in engine operation so as to be subjected to the impact of such fluid flow, and an arrangement whereby the infinitely variable transmission will be predeterminedly automatically shifted in accordance with predetermined fluid flow conditions. In the illustrated embodiments, I employ a vane to effect the control although it would be understood that many other arrangements may be employed for the same purpose.

In one of the illustrated embodiments, the ratio of transmission is shifted directly by and in accordance with the movement of the vane under the impact of the gas flow, and in another, I show an arrangement wherein the tendency of the vane to shift in accordance with the variation in the impact of such fuel flow will cause means such as a servo motor to become effective to shift the transmission in either one direction or the other as the tendency of the vane to shift varies from time to time.

The predetermined fluid flow conditions referred to will depend in each case upon what are the ideal requirements of that particular case. For example, if it is desired that a vehicle be operated most of the time under full power, then the arrangement should be such that if there is any drop in fluid flow, below that of full power operation, the shift will be immediately downwardly, i. e., to low speed ratio to develop the power in the engine but at lower vehicle speed, and therefore to provide for this the arrangement would be such that the vane would be responsive to such drop in fluid flow to effect a shift of the transmission in a downward direction, or where a servo motor is employed, to make the servo motor responsive for the same purpose. The arrangement here outlined would be applicable generally to the operation of a truck. On the other hand, city driving in a pleasure car is characterized by two factors, namely, frequent stopping and starting and relatively low vehicle speed, which, in turn call for shift to high and vehicle operation at less than full engine power. For providing these characteristics, my arrangement of control will be such that immediately upon an increase of gas flow the shift will be to high and reaches the high end of its range before the engine develops its full power.

These are but two examples of many specific operating conditions or requirements for which my control can be specifically adapted, and in connection with these two examples it will be pointed out that just as my arrangement functions in one direction to reduce in one case or to increase in the other case, the ratio of transmission, so also will my arrangement function in the reverse direction upon a change in the gas flow in the opposite direction. From these two examples it will also be gathered that the functioning of the vane for purposes effecting a ratio change can be set to start at any predetermined condition in the gas flow. For example, let us assume that for the specific type of truck referred to and the work that it is to do and the character of road over which it is to operate, it is desirable that my control become effective immediately upon the least drop in full power operation of the motor, then the vane will be constructed, supported and associated so as to effect its operation at that time. Assume, however, that the conditions for another type of truck are entirely different and that although it is desired to operate at full power, at the same time we do not desire it to be as sensitive to such operation. Then we can make the arrangement such that the drop would not be effective until there is a substantial drop from full engine power. So also with a pleasure vehicle which is driven only slightly in the city and a great deal in the country, the approximation of a full power operation would be of greater importance in a vehicle so used and a compromise between city requirements and country requirements could be effected, as for example, by taking an intermediate position of operation of the vane between the relatively low vehicle speed in high ratio in the city and the relatively higher vehicle speed permitted in the country.

While my control is intended to be automatic, I recognize that the gas flow is effected by the accelerator operation and my invention permits of use of this fact to this extent. In the event that the driver desires either to advance or retard the functioning of my control means he can do so by operating the accelerator pedal.

For example, the truck driver will advance the operation of the vane and the drop in the ratio of transmission by suddenly releasing the accelerator.

While the accelerator control which I have above set forth is purposefully operated by the driver for the purpose set forth, it will be understood that the accelerator is normally operated as an essential element for automobile driving and to this extent will modify the operation of my automatic control. In accordance with another embodiment of my invention I contemplate that this control of the accelerator by the driver for driving purposes be made to automatically affect the functioning of my control arrangement so that my control arrangement will, in effect, operate as a resultant not only of the gas flow but also of the operation of the accelerator.

For the attainment of these objects and of such other objects as may hereinafter appear or be pointed out, I have illustrated embodiments of my invention in the drawings, wherein.

I have already stated that I am disclosing as a specific application of my invention its employment with a motor vehicle driven by an internal combustion engine. This is being done partly because my invention is peculiarly of utility in such connection and partly because the features of utility of my invention can well be explained in connection with such operation. It will be understood, however, that my invention has been so described merely for purposes of convenience of description and disclosure, and that the scope of my invention or its applicability is not to be construed as limited thereby unless and only insofar as limitations are called for by specific language in the claims.

Figure 1:
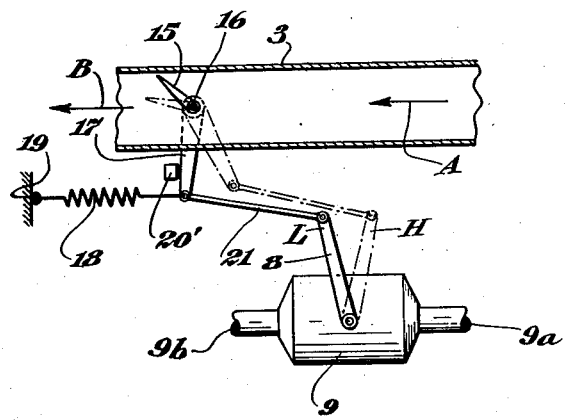
Fig. 1 is a diagrammatic showing of one embodiment of my invention.

In Fig. 1 of the accompanying drawings is shown a conduit 3 which may represent either the manifold or the exhaust of an internal combustion engine or any other conduit through which fluid is drawn or propelled as a feature of prime mover operation. This conduit may be the conduit through which a fluid such as the surrounding atmosphere or water is propelled upon a movement of the vehicle or a part thereof. For purpose of convenience of reference the element 3 will be assumed to be the gas supply manifold of an internal combustion engine, the gas coming from a supply point at the right, arrow A, and being fed to the engine, left arrow B. The direction of fluid flow will be assumed as shown by the arrows.

A vane 15, fastened to spindle 16 is located within the conduit 3. The spindle 16 is positioned with respect to the vane 15 so that the vane extends substantially to one side of the spindle. The impact of the gas flow through the conduit upon the vane will tend to move the vane 15 with a force that increases with an increase in the magnitude of the gas flow; such movement of the vane will cause a limited rotation of the spindle 16. The latter may extend through the sides of the conduit 3 and have rigidly secured to one end, a lever arm 17. The vane 15 is preferably biased in one direction in any preferred or desired manner as by a tensile spring 18, one end of which is shown as connected to the lever arm 17 and the other end is connected at 19 to a part of the machine frame.

It will be evident that the spring tends to move lever arm 17 in a clockwise direction against a stop 20'. When the engine is "dead", i. e., when there is no gas flowing in the manifold, the spring will maintain the lever arm 17 and the vane 15 as shown in solid lines in Fig. 1.

It is important to point out that the impact force tending to move the vane 15 is responsive to the magnitude of the gas flow and not to the pressure of the gas within the conduit. The impact of the gas stream upon the vane is in direct correspondence to the weight or mass of fluid that hits the vane during a given time intervening, say one second. As a matter of fact the impact force is equal to the "wind resistance" of the vane in the fluid flow and therefore varies in direct proportion to the square of the speed of the flow and in inverse proportion to the density of the gas. This is a very important feature of my invention and what causes its distinguishing advantages over such other devices which use merely the pressure of the gas within the conduit as a medium to operate a control member.

This explanation of one of the underlying basic principles of my invention makes it manifestly clear that the mechanism means used to vary the same in effect are not limited to the type of gas-inertia governor illustrated in the drawings. It is obvious that any kind of governor means that respond to the impact of a gas flow, or to its magnitude will constitute a full equivalent to the governor device illustrated and that any such other means can easily be substituted.

In the illustrated embodiment, the control of the transmission from the vane 15 is effected by a connecting rod 21 at the distal end of the lever arm 17 connecting the latter with the shift lever 8 of a variable transmission 9 of the adhesive type of which that shown in U. S. Patent No. 1,859,502 is an example. The input shaft of the transmission is designated 9a and the output shaft 9b. The shift lever is shown in solid lines in a low ratio position, designated "L", and is shown in dot and dash lines in a high ratio position, designated "H".

It has already been pointed out previously that my control arrangement will be constructed and associated so as to meet specific requirements of a particular type of vehicle and of specific conditions under which it is to be operated. The important features in this respect are: (1) that point in the fluid flow at which my control is to become operative in order to change the ratio of transmission and (2) the range during which it is to continue to operate for such purpose and (3) the rate at which it is to operate.

The first feature, that is, the point at which my arrangement will begin to function, namely, the point at which the vane will begin to move under the impact of the gas flow, will be determined by the load factor, that is, the resistance offered by the vane 15 to its movement under the impact of a gas flow and this resistance naturally is made up in the instant case, by the pressure of the spring 18, the unbalanced weight of all the associated parts included in Fig. 1 and the friction necessary to be overcome in order to shift the transmission.

It will be understood that this factor of the load can be controlled at will and can be provided in innumerable ways so as to increase or decrease it. For example, certain parts can be arranged so that, instead of being loading weights, they act under force of gravity to the opposite effect. Or, again, the major part of the load may consist of merely a body acting under the force of gravity or inertia such as a weight. In whichever way the load is obtained, it is important to point out that the load will determine the point at which the vane 15 will move to shift the transmission, and, therefore, assuming again the case of a truck to be driven at full power and to be shifted into low, the moment it drops below full power operation, the load resisting the movement of the vane 15 will be just a little bit less than that necessary to overcome the impact of the gas flow at full power. Therefore, by controlling the load resisting the movement of the vane 15, I am enabled to fix the point at which the gas impact will effect the operation of my control member for transmission shifting purposes. So, also, I am enabled to so devise my control that once the vane is moved it will continue to shift entirely from high to low, unless there is a sudden reverse condition in the gas flow. Or, again, I may make my arrangement such that the vane will continue resisting further movement even after it has been moved so that there has to be a continuously increasing impact in order to cause the vane to move over the entire range for a full gear shift. So, also, I can devise my arrangement so that, in shifting from low to high whether under an initial impact by the gas, or under a continuously increasing impact of the gas flow, the shifting movement can be retarded or accelerated.

To explain the operation of the device of Fig. 1 in condition with vehicle operation, we will assume that the throttle of the engine is held at a given position and that the vehicle, moving at a constant speed, suddenly encounters resistance, such as is offered by a hill. The first effect of the resistance is, of course, to slow up the vehicle.

Inasmuch as the ratio of transmission remains unchanged, the slowing up of the vehicle will be accompanied by a decrease in flow of gas. My control will be so devised that this decrease in the flow of gas will cause the spring 18 to shift the vane clockwise to cause a shifting of the transmission lever towards low ratio L. This is exactly what would be done manually by the operator of a motor car when meeting a hill or other resistance, except, of course, that this is automatically achieved by the device described, and where the transmission is of the adhesive type, it will shift, not to an arbitrary ratio, but to that exact ratio which is required, assuming that my control arrangement is of that type which permits of this gradual shifting of the ratio of transmissions under those conditions.

The shifting to low ratio will result in the greater application of engine torque required to overcome the encountered resistance, which effects a gradual speeding up of the engine and vehicle until a constant speed is attained for the given constant resistance. This vehicular speed will, of course, be less than that maintained before the resistance was encountered, since we are assuming the throttle remains unaltered.

When the vehicle passes the up-grade and encounters either a down-grade or a level stretch, and with the throttle still unchanged, the engine speed will increase to cause an increased gas flow which, in turn, causes the inertia vane to move and thus shift the transmission shift lever to high ratio H, which is the desired gear ratio under the assumed road condition, namely, little vehicular resistance.

Automatic control of the variable transmission will be effected by the device not only in overcoming vehicular resistance and in adjusting the transmission ratio upon overcoming the resistance as just outlined, but will be also effected in accelerating or decelerating the vehicle. Assume the vehicle to be at a standstill with the engine dead or merely idling and the clutch out. Since there is no, or at least very little gas flow, the spring will hold the shift lever in low gear. The throttle is now opened wide. Due to the fact that the engine is turning over very slowly, the gas flow will be at a minimum. Hence, the transmission is still in low, which is as it should be in starting the vehicle by throwing in the clutch. The supply of gas to the engine develops a greater torque and the engine picks up speed. As the engine speed increases, the gas flow through the supply manifold increases and the increasing gas flow will gradually shift the ratio toward high. Concurrently, the vehicle is being accelerated.

In the embodiment of Fig. 1 the functioning of the governor 15 is dependent entirely upon the gas flow. This will serve satisfactorily for the operation of an internal combustion engine under all conditions, where either a full speed range or a full power range is required. Operating conditions, that require a combination of a full speed range with a full power range and also such cases where the power developed by the engine will not immediately correspond to the throttle generation, require a modified arrangement.

Figure 2:
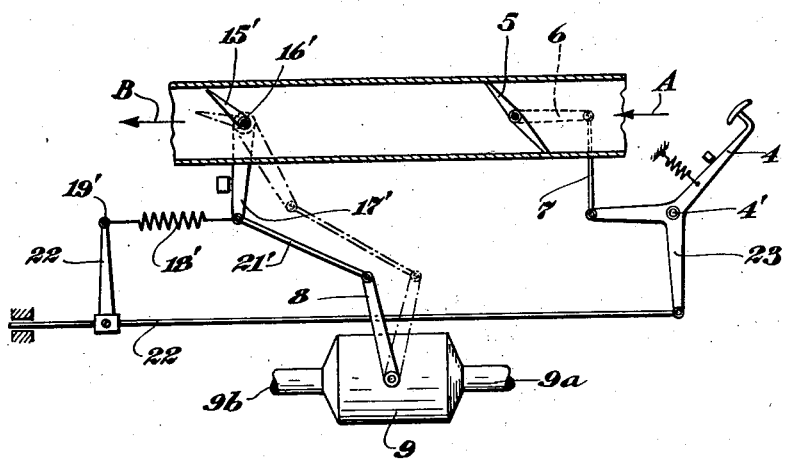
Fig. 2 is a diagrammatic showing similar to that of Fig. 1, of a modified embodiment.

In the embodiment of Fig. 2 I have shown an arrangement for an internal combustion engine employing a throttle whereby in the event of this aforementioned condition, namely, less than full engine power and sudden opening of the throttle, means are provided for retarding the movement of the governor and therefore the movement of the transmission towards high and thus accelerate the increase in engine power.

This acceleration of the increase in the engine power will in turn accelerate the increase in the gas consumption and therefore of the gas flow until a point of balance is reached between the accelerator position and the gas flow at which time the transmission will cease moving toward low and then will begin to move toward high. By this arrangement the pickup of the engine is accelerated under sudden throttle operation to open position.

My arrangement of Fig. 2 contemplates (a) that the operation of the throttle shall always increase the loading of the governor so as to increase its resistance to operation by the impact of the fluid flow and thus indirectly to retard the operation of the governor; (b) that this resistance to the governor action shall provide for the lag between throttle opening and engine pickup, and therefore that the transmission will be moved to low to increase the engine power only under this aforementioned condition.

Referring to Fig. 2 of the drawings, I show there all the parts shown in Fig. 1 except that the corresponding parts have applied to them the same numerals as in Fig. 1 but primed and in addition I have shown the presence of a throttle and an arrangement whereby the operation of the throttle to open position tends to increase the load on the governor 15 and thus its resistance to movement by the gas flow and the operation of the throttle in the reverse direction tends to do just the reverse.

In Fig. 2 the throttle is shown at 5, to be adjusted in the conventional manner by the accelerator pedal 4 through rod 7 and lever 6 and my arrangement has been shown, for purposes of illustration, as comprising the following parts: the spring 18' is connected at 19' to one end of a movable frame 22, the other end of the frame being journaled to the free end of the lever 23 carried by the accelerator pedal 4 pivoted at 4', the arrangement being such that the operation of the accelerator pedal 4 in either direction will move the lever 23 either clockwise or counterclockwise as the case may be, to move the member 22, either to the left or the right in accordance therewith. In such movement of the frame 22 the point 19' of securement of the spring 18' will also be shifted either to the left or to the right to increase or decrease the load of the spring upon the governor 15' through the member 17'.

We will assume that the motor is being operated under thirty per cent power, and the throttle is suddenly opened wide. Under these circumstances it is well known that the engine pickup is not immediately responsive to such throw of the accelerator, and that the gas consumption will not immediately correspond to the wide open throttle position. We then have a condition in which, while the gas flow may be accelerated thus increasing the force of the gas flow and tending to move the governor 15 in one direction, the movement of the accelerator pedal will impose upon the governor a greater force tending to move the governor in the opposite direction so that the resultant effect will be to tend to move the governor against the gas flow and therefore to move the transmission toward low to thus increase the engine speed which in turn will increase the gas consumption which in turn will reduce the unbalance between the two forces acting upon the governor until a point of balance is passed so that the gas flow is increased to a point where it is able to move the governor in an opposite direction, the transmission will then begin to move toward high until a balance is again reached of most efficient motor operation. In this way I accomplish the general purpose of my arrangement, namely, of making the motor more quickly responsive to quick throttle operations to shorten the period of motor pickup.

In the embodiment of Figs. 1 and 2, the transmission has been illustrated as shifted directly by the force of the gas flow.

Figure 3:
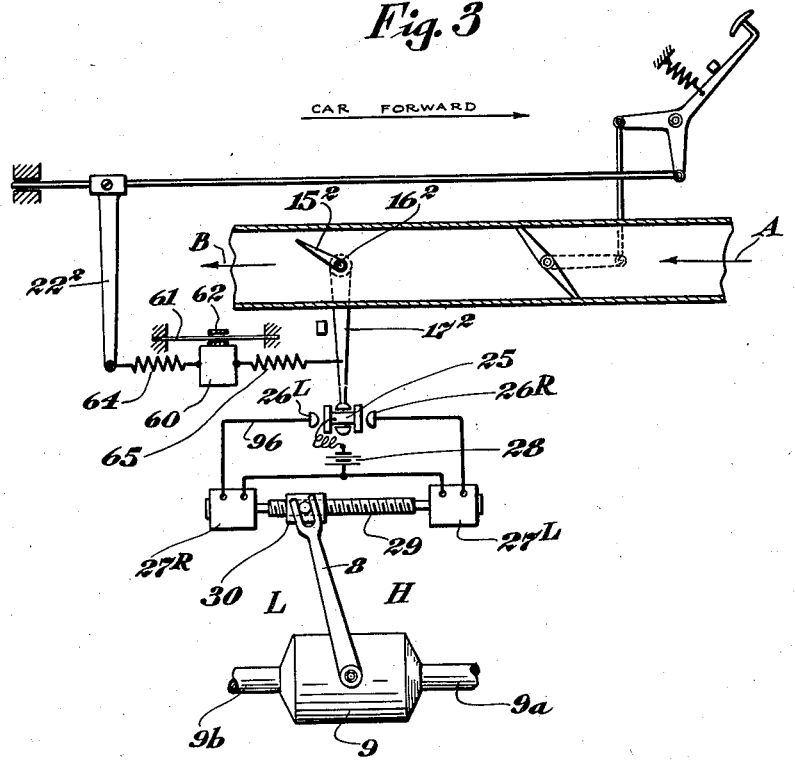
Fig. 3 shows diagrammatically a modification of features of the embodiments of Fig. 1.

I have illustrated in Fig. 3 an arrangement similar to that of Fig. 2 except that the force of the gas flow serves only to shift the governor member 15 and does not serve to shift the transmission. This arrangement contemplates that the movement of the governor shall serve to control a mechanism such as a servo motor, which functions to shift the transmission.

Upon viewing Fig. 3 it will be observed that the governor member $15^2$ is constituted generally as in the embodiments of Figs. 1 and 2 and comprises a vane pivoted at $16^2$ and provided with an arm $17^2$, the governor member being predeterminedly loaded in one direction and it will here be stated that as this governor member does not shift the transmission, that therefore the force necessary to move it is substantially that imposed upon it by the load which as already stated can be predetermined as desired or required and which we will assume in the instant case will be a force of $z$ pounds. Whenever the force of the gas flow to the intake manifold falls below $z$ pounds, then the governor member $15^2$ will swing clockwise under the impulse of the load and when the force of the gas flow increases to above $z$ pounds, it will move counterclockwise, and in this movement will correspondingly move the free end of the arm $17^2$.

On the crank arm $17^2$ is an electrical contact 25 properly insulated from the arm. On either side of the crank arm $17^2$ and spaced a short distance from contact 25 are two contacts 26L and 26R. These contacts form part of an electrical circuit which includes two motors, 27L and 27R and an electrical source 28. Both motors are coupled to the respective ends of a worm screw 29; the left motor 27R, when the circuit thereto is closed, is effective to rotate the worm screw in one direction; and the right motor 27L is effective to rotate it in the opposite direction. Riding upon the screw is a threaded collar 30, to which is operatively articulated the shift lever 8 of the variable transmission 9. It will be supposed that the left motor will move the shift lever to the left, i. e., low gear ratio, and that the right motor will shift the transmission to high ratio.

We will assume that the vehicle is being employed in city driving and the most efficient operation is a power consumption of 60 horsepower. It is well understood that the engine power is dependent entirely upon the gas consumption which in turn is of course indexed by the gas flow. The load in such an arrangement will be devised so as to exactly balance the gas flow necessary to develop 60 horsepower in the motor. Let us assume further that the automobile is driving under exactly this condition of a 60 horsepower, and either because of the accelerator operation, road conditions, etc., the gas flow is reduced. The force applied to the governor by the gas flow will be less than the load imposed upon the governor. This condition of unbalance will cause the load to move the governor clockwise to bring the contact 25 on the lever 17² into contact with the contact 26L to close the circuit 96, energizing motor 27R which will automatically function to move the transmission toward low to thereby increase the speed of the motor which in turn will increase the gas flow until a condition of balance is again reached in which the gas flow will have reached the predetermined magnitude to balance the force of the spring and the governor will again move to the neutral position shown in Fig. 3.

Let us assume on the other hand that the reverse conditions occur in which the engine power is suddenly increased producing an increased flow of gas. In such a condition the force of the gas flow will be greater than that of the load and the governor will be unbalanced to move counterclockwise so as to bring the contact 25 into contact with the contact 26R to close the circuit to the motor 27L which will immediately shart to shift the transmission to high to increase the load upon the motor to reduce its speed and therefore decrease the flow of the gas until the predetermined balance is again arrived at.

By my arrangement the transmission will be automatically moved and held at the ratio which will give the predetermined engine power and in turn the predetermined gas consumption.

The lag between the departure of the gas flow from its predetermined consumption and the restoration thereof to the predetermined consumption will naturally depend upon the responsiveness of the engine to variations in the gas flow and to variations in the ratio of transmission, the responsiveness of the servo-motor to the governor and the speed at which the servo motor is operated to change the ratio of transmission.

A further feature of my invention contemplates the employment of a weight either as an alternative or as supplemental to the employment of a spring for loading the governor.

My invention further contemplates that the weight, when employed, will serve not only to replace a spring or to supplement it in its normal functioning, but also may serve added functions due to the fact that unlike a spring, a weight will partake of and be responsive to vehicular acceleration and deceleration and also gravitationally to the inclination of the vehicle as it ascends or descends a hill.

In Fig. 3 of the drawings I have shown a composite arrangement in which the load upon the governor is effected by the employment of a spring combined with a weight and upon viewing this figure it will be observed that the spring 18' of Fig. 2 has been replaced by a composite arrangement comprising a weight 60 mounted for movement in the direction of the movement of the vehicle in any preferred or desired manner, as for example, by being suspended for sliding movement, from the rod 61 mounted in the frame of the car by a hanger loop 62. Between the weight 60 and the frame 22² is a tension spring 64 connected at one end to the frame 22 and at the other end to the weight 60. A second tension spring 65 is positioned to the other side of the weight, one end thereof being also connected to the weight 60 and the other end to the arm 17². The two springs 64 and 65 will function generally as does the spring 18' in Fig. 2; namely, to normally tend to move the transmission to low. Assuming for the moment that the arm 17² and the frame 22² are both stationary then the springs 64 and 65 will both be acting upon opposite ends of the weight in opposite directions so that the weight, if in a condition of unbalance, will move to a condition of balance between the forces of the two springs or if already in that condition will remain in that condition. Assuming now that either the arm 17² or the arm 22² is moved to increase or decrease the pulling force of its associated springs 64 and 65 then this condition of balance would be disturbed and the weight moved in one direction or the other to again reach a stage of balance. We have assumed in this description of the operation of the two springs and their related parts that there are no changes in the position of the vehicle or in the speed at which the vehicle is moving which will affect the weight independently of the springs. However, let us assume an acceleration of the vehicle in the direction of the arrow marked "Car forward". The weight 60 will tend to move in the opposite direction or to "lag behind", and this action will increase the tension of the spring 65 and tend to shift the transmission to low. A deceleration of the car will have just a reverse effect.

So also let us assume again that the car is climbing the hill in which event the right or forward end of the car will be at a higher level than the left end in Fig. 3 in which event the weight 60 will tend to move toward the left because of the corresponding inclination of the rod 61 and in so doing again will tend to move the transmission toward low and where the car is descending the hill its action will be just the reverse.

It will be understood, of course, that by changing the pulling forces of the spring relatively to each other and also to the inertia of the weight 60 that the functioning of the weight above referred to can be predetermined with reference to the acceleration or deceleration of the car or with reference to the inclination or declination of the vehicle.

I will now describe an arrangement whereby the accelerator pedal in addition to having a normal throw for full throttle operation, can be given an additional increment of movement which does not affect the throttle position but does serve to shift the transmission to low.

The general purpose of this arrangement is to permit a control of the transmission directly by the operator through operation of the accelerator pedal and which control is otherwise without effect upon engine operation.

Upon viewing Fig. 4 of the drawings, it will be observed that the link 37 instead of being connected directly to the accelerator pedal 36 as the embodiments of Figs. 2 and 3 is operably associated with said accelerator pedal 36 in the following manner. To one end of the link 37 is attached the member 38 so arranged as to receive the spring 39. The free end of the pedal arm 36b, which in other embodiments was connected directly to the link 37, is here so positioned with reference to the member 38 and the spring 39 that the operation of the pedal 36 will cause the pedal arm 36b to operate the throttle by and through the spring 39. An important feature of my invention is that the resistance to compression offered by the spring 39 is greater than the normal resistance offered by the throttle to being moved to an open position and that therefore upon the operation of the pedal 36 the throttle will first be opened thereby without any spring compression or in other words the spring will act as a rigid connecting member.

The upward movement of the member 38 to open the throttle is limited by the abutment 40 and it will here be stated that the parts are so related and dimensioned that this limitation stop will be effected just when the throttle is open fully but however, before the pedal 36 has reached the limits of its movement. Therefore any continuation of the pedal movement beyond the point where 38 is stopped by 40 will cause the pedal to compress the spring and this portion of the pedal operation might be termed a pedal throw without throttle operation.

Fixed to the pedal 36 is another arm 36a, to the free end of which is secured the link 41 guided through a portion of the frame 42. The link is intended to change the ratio to low under the conditions and generally in the manner now to be described.

When the pedal 36 is operated to open the throttle, it will also move the link 41 to the left as shown in the dotted line position. The link is so dimensioned and related to the ratio changing lever 52 that when the pedal 36 has reached that position which corresponds to full open throttle, the end 43 of the link 41 will have reached that position which will cause it to make contact with the ratio changing lever 52 in its dotted line position i. e. high. The throw permitted to the pedal 36 beyond full throttle open position will correspondingly throw the end of link 43 from its dotted line position 43a to its dotted line position 43b at which position it will contact with the changing lever in its low position. In other words a full throw of the pedal beyond throttle opening position will cause the link 41 to move the ratio changing lever all the way over to low, from whatever might have been its position above low.

Figure 4:
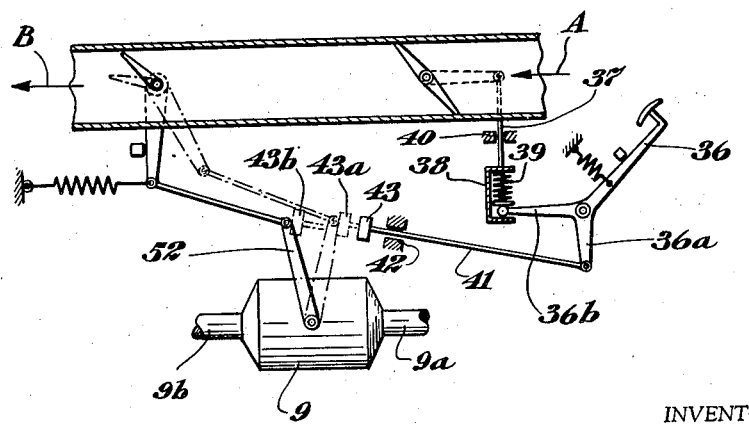
Fig. 4 shows an improvement.

It will be understood in connection with the embodiment of Fig. 4 that the feature of my invention resides in that the pedal will have an increment of movement beyond wide open throttle during which increment of movement it will automatically shift the transmission to low if that transmission should be in high or any other position above low. In this way the driver has direct control of the transmission for circumstances and conditions where the automatic control of the transmission will not meet requirements. It will be understood that Fig. 4 illustrates but one of the many ways in which my invention can be carried into effect. This is also true of the other features of my invention illustrated in my other embodiments.

It will be understood that the embodiments shown in my drawings are merely illustrative and are not to be limited except as called for by the prior art. For example, the inertia governor has been illustrated in the embodiment employing a throttle as between the throttle and the motor. My invention does not require this arrangement.

Having thus described my invention and illustrated its use, what I claim as new and desire to secure by Letters Patent is:

1. In combination with an internal combustion engine, a variable speed transmission to drive a load therefrom and means responsive to the magnitude of the gas flow through the intake manifold of said engine for automatically controlling the ratio of said transmission.

2. In combination with an internal combustion engine, a variable speed transmission to drive the load therefrom, means responsive to the magnitude of one of the fluid flows incident to the operation of the engine to change the ratio of transmission, said means including a resilient element so related and constructed as to tend to change the ratio of transmission to low.

3. The combination of an internal combustion engine, means for transmitting the power of said engine at a variable ratio, means for conducting a fluid to the engine for engine operation, and means responsive to the magnitude of the flow of said fluid for controlling the ratio of the said transmitting means.

4. In combination with an internal combustion engine, a transmission for driving a load from said engine at variable speeds, means for changing the ratio of said transmission, an intake system for conducting the energizing fluid to said engine, manually operable means for controlling the fluid flow through said system, means responsive to the magnitude of a fluid flow in said system so as to be moved in one direction by an increase of said flow, resilient means tending to move said responsive means in the opposite direction, means automatically operative to cause the ratio changing means of the transmission to be moved toward high speed ratios whenever the said responsive means move under the influence of increased fluid flow and means operated by said manually operable control means for counteracting the effective operation of the said fluid flow upon said responsive means.

5. In combination with an internal combustion engine having an intake system for conducting the energizing fluid to said engine, manually operable means for controlling said fluid flow, a transmission for driving a load from said engine at variable speeds, means for changing the ratio of said transmission, means responsive to changes in the magnitude of the fluid flow and the operation of the manually operable means to operate the ratio changing means.

6. In combination with a vehicle, an internal combustion engine and a transmission driven therefrom, and having an output shaft for driving a load, means for varying the ratio of said transmission, a conduit for a gas flow accompanying engine operation, manually operable means for controlling said gas flow, a governor responsive to said gas flow arranged to be moved in one direction by an increase of the gas flow, means tending to move the governor in the opposite direction, said last mentioned means comprising a resilient element and a weight and means automatically operative upon any change in the position of the governor to cause a change of the ratio of the said transmission.

7. In combination with a vehicle, an internal combustion engine and a transmission driven therefrom, and having an output shaft for driving a load, means for varying the ratio of said transmission, a conduit for the gas flow incident to the operation of the engine, manually operable means for controlling said gas flow, a governor responsive to said gas flow arranged to be moved in one direction by an increase of the gas flow, loading means for said governor tending to move it in the opposite direction, said loading means comprising resilient means and a mass movable lengthwise with respect to the vehicle and means automatically operative upon any change in the position of the governor to cause a change of the ratio of the said transmission.

8. In combination with a vehicle, an internal combustion engine and a transmission driven therefrom, and having an output shaft for driving a load, means for varying the ratio of said transmission, a conduit for the gas flow incident to the operation of the engine, manually operable means for controlling said gas flow, a governor responsive to the magnitude of said gas flow so arranged as to be moved in one direction by an increase of the gas flow, loading means for said governor tending to move it in the opposite direction, said loading means comprising resilient means and a weight and means automatically operative upon any change in the position of the governor to cause a change of the ratio of the said transmission.

9. In combination with a vehicle, an internal combustion engine and a transmission driven therefrom, and having an output shaft for driving a load, means for varying the ratio of said transmission, a conduit, a gas flow incident to the operation of the engine, manually operable means for controlling said gas flow, a governor responsive to said gas flow so arranged as to be moved in one direction by an increase of the gas flow, loading means for said governor tending to move it in the opposite direction, said loading means comprising resilient means and a mass movable lengthwise with respect to the vehicle, means operatively connected to the said manually operable means to vary the load upon the governor, and means automatically operative upon any change in the position of the governor to cause a change of the ratio of the said transmission.

10. In combination with a vehicle, an internal combustion engine and a transmission driven therefrom, and having an output shaft for driving a load, means for varying the ratio of said transmission, a system for conducting a gas flow incident to the operation of the engine, manually operable means for controlling said gas flow, a governor responsive to said gas flow so arranged as to be moved in one direction by an increase of the gas flow, loading means for said governor tending to move it in the opposite direction, said loading means comprising resilient means and a mass movable lengthwise with respect to the vehicle, means operatively connected to the said manually operable means to vary the load upon the governor, means operatively connected to the said resilient means and to said manually operable means for increasing the force of the said resilient means.

11. In combination with a vehicle, an internal combustion engine and a transmission driven therefrom and having an output shaft for driving a load, means for varying the ratio of said transmission, a system for conducting a gas flow incident to the operation of the engine, manually operable means for controlling said gas flow, a governor responsive to said gas flow and so arranged as to be moved in one direction by an increase of the gas flow, loading means for said governor tending to move it in the opposite direction, means operatively connected to said governor and to said manually operable means to vary the load upon the governor.

12. In combination with a vehicle, an internal combustion engine, a transmission driven therefrom having an output shaft for driving the vehicle, means for varying the ratio of the said transmission, a system operatively connected to said engine for conducting a fluid flow indicative of the power developed by the engine, manually operable means for controlling the power developed by said engine, a governor responsive to said fluid flow so arranged as to be moved in one direction by an increase of said fluid flow, loading means for said governor tending to move it in the opposite direction, said loading means comprising a movable mass so arranged as to increase the load upon the governor whenever the vehicle is accelerated in the forward direction, means for changing the load upon the governor in response to changes of the position of the said manually operable means and means automatically operative for causing a change of the ratio of the transmission in correspondence with changes of the position of the governor.

13. In combination with an internal combustion engine and a variable speed transmission driven thereby, means for changing the ratio of the transmission, means for controlling the power developed by said engine, means operatively connected to said engine for conducting a fluid flow indicative of engine operation, and a governor responsive to the magnitude of such fluid flow, means for operating the ratio changing means of said transmission in response to change in the position of the said governor, a manually operable member connected to the power control means and operable upon said ratio changing means, said manually operable member operating upon the power control means only during the first part of its throw and upon the ratio changing means only during the second part of its throw.

14. In combination with an internal combustion engine, a transmission driven by said engine and means for varying the ratio of said transmission; an intake system for said engine comprising a throttle and manually operable means to control said throttle, a governor responsive to the magnitude of the gas flow of the intake system, and means operative to cause the ratio changing means of the transmission to be moved toward high speed upon the movement of the governor under the influence of an increased gas flow, and means operative between the said governor and the said manually operable means for partially retarding such movement of the governor.

15. A combination with an internal combustion engine, a variable speed transmission comprising means for changing its ratio, a governor responsive to the magnitude of the gas flow through the engine so arranged as to be moved in one direction by an increase in gas flow, a resilient means for moving the governor in the opposite direction and a servo system to be operated by the movement of the governor, the servo system being operatively connected also to the ratio changing means of the transmission so as to cause a change in ratio toward low speed upon a decrease in the gas flow and a change toward high speed upon an increase in the said gas flow.

16. In combination, a prime mover, means for energizing the prime mover including a fluid flow whose magnitude corresponds to the energy of the prime mover, a transmission driven from the prime mover, means for varying the ratio of the transmission and means responsive to the magnitude of said fluid flow to render said ratio changing means effective.

17. In combination with a prime mover, means for energizing the prime mover, a system operatively connected with said prime mover to conduct a fluid flow accompanying the operation of said prime mover, a variable transmission driven from the prime mover, means for varying the ratio of the transmission, and means responsive to the dynamic effect of said fluid flow to cause said ratio changing means to become operative.

18. In a combination, a vehicle, driving means therefor including a motor energized by a fluid flow, means for changing the speed at which the vehicle is driven, said means being responsive to the magnitude of said energizing fluid flow.

19. The combination of a prime mover, energized by a fluid flow, a variable transmission operated thereby, and means responsive to the magnitude of said fluid flow for automatically controlling the ratio of said variable transmission.

RICHARD ERBAN.